Feb. 14, 1933.　　　F. W. EDWARDS　　　1,897,503
LUBRICATING APPARATUS
Filed Oct. 26, 1929　　　5 Sheets-Sheet 1
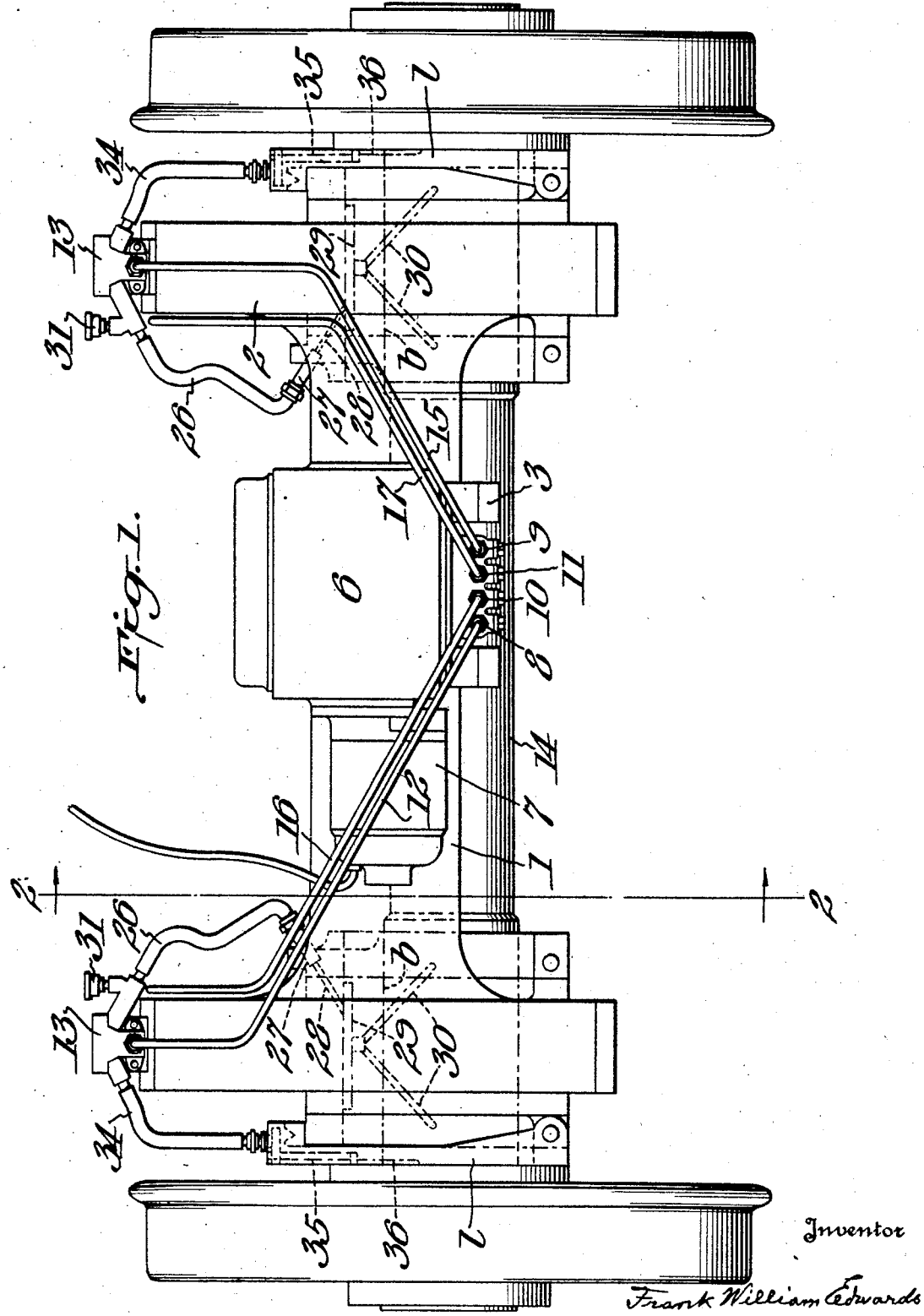
Inventor
Frank William Edwards
by
W.H. Finckel
Attorney Feb. 14, 1933.     F. W. EDWARDS     1,897,503
LUBRICATING APPARATUS
Filed Oct. 26, 1929     5 Sheets-Sheet 2
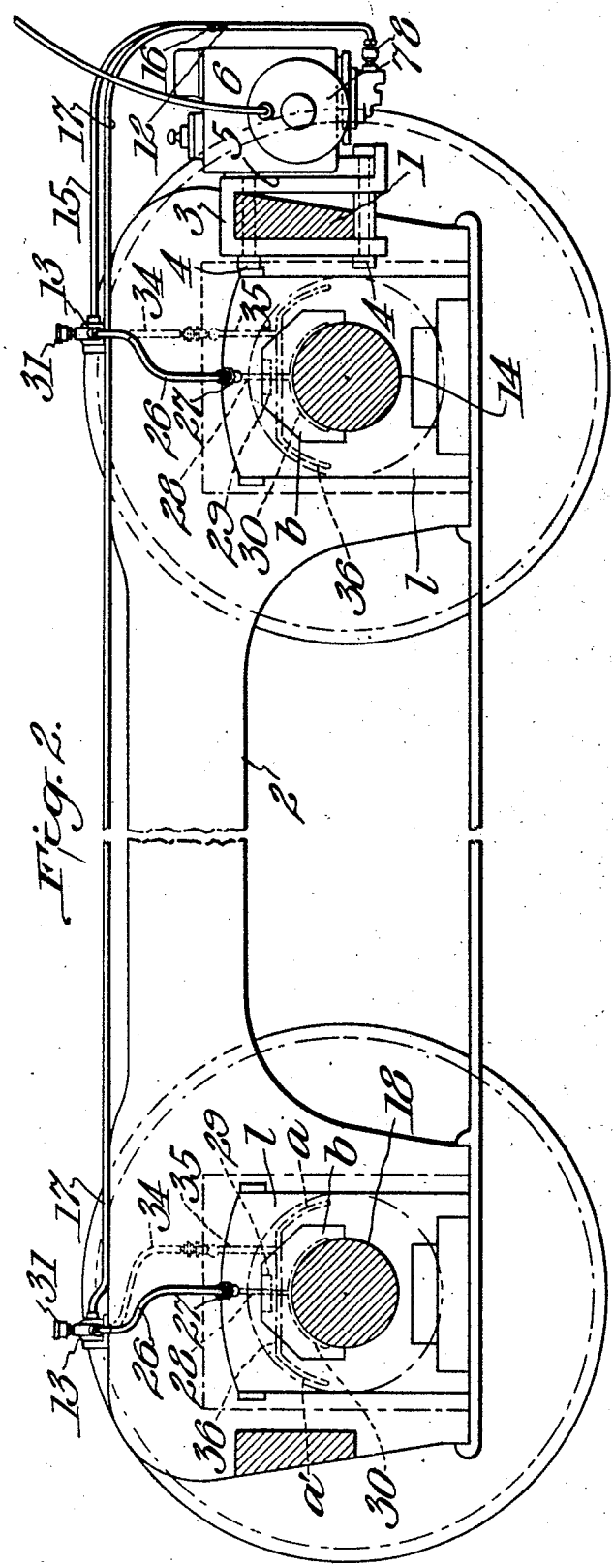
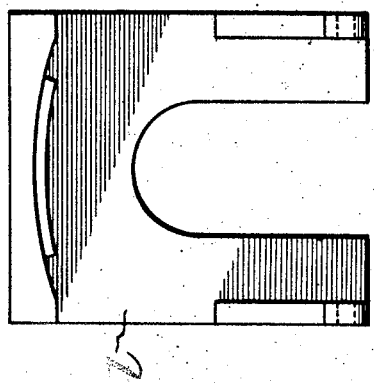
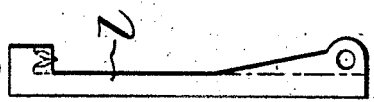
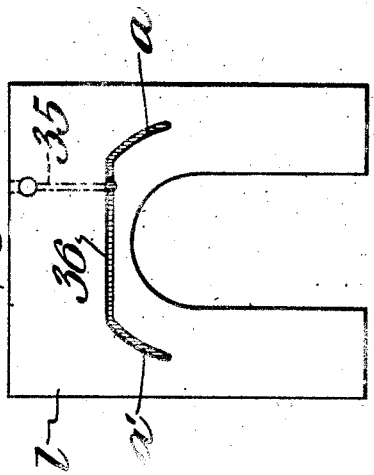
Inventor
Frank William Edwards
by
W. H. Finckel
Attorney

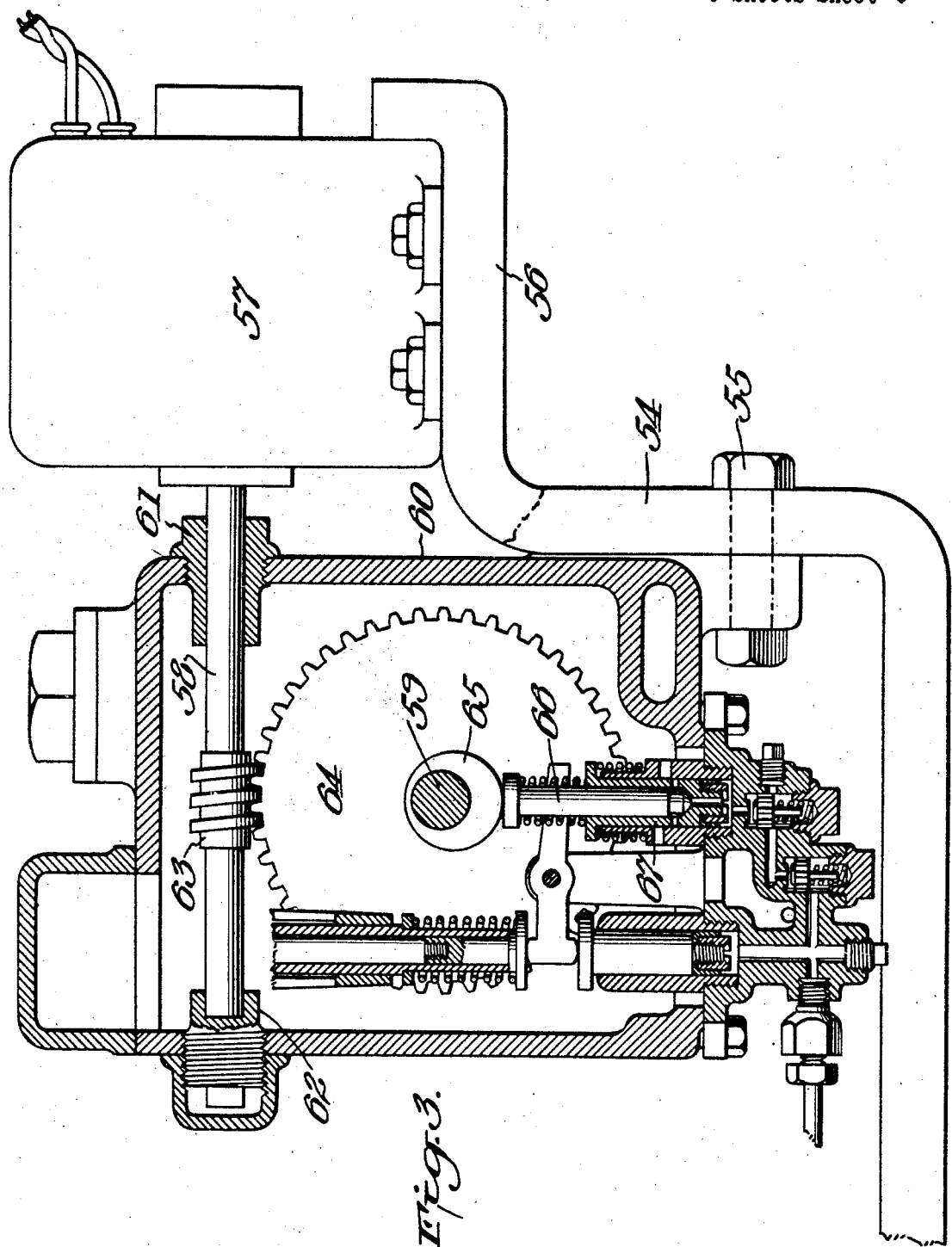

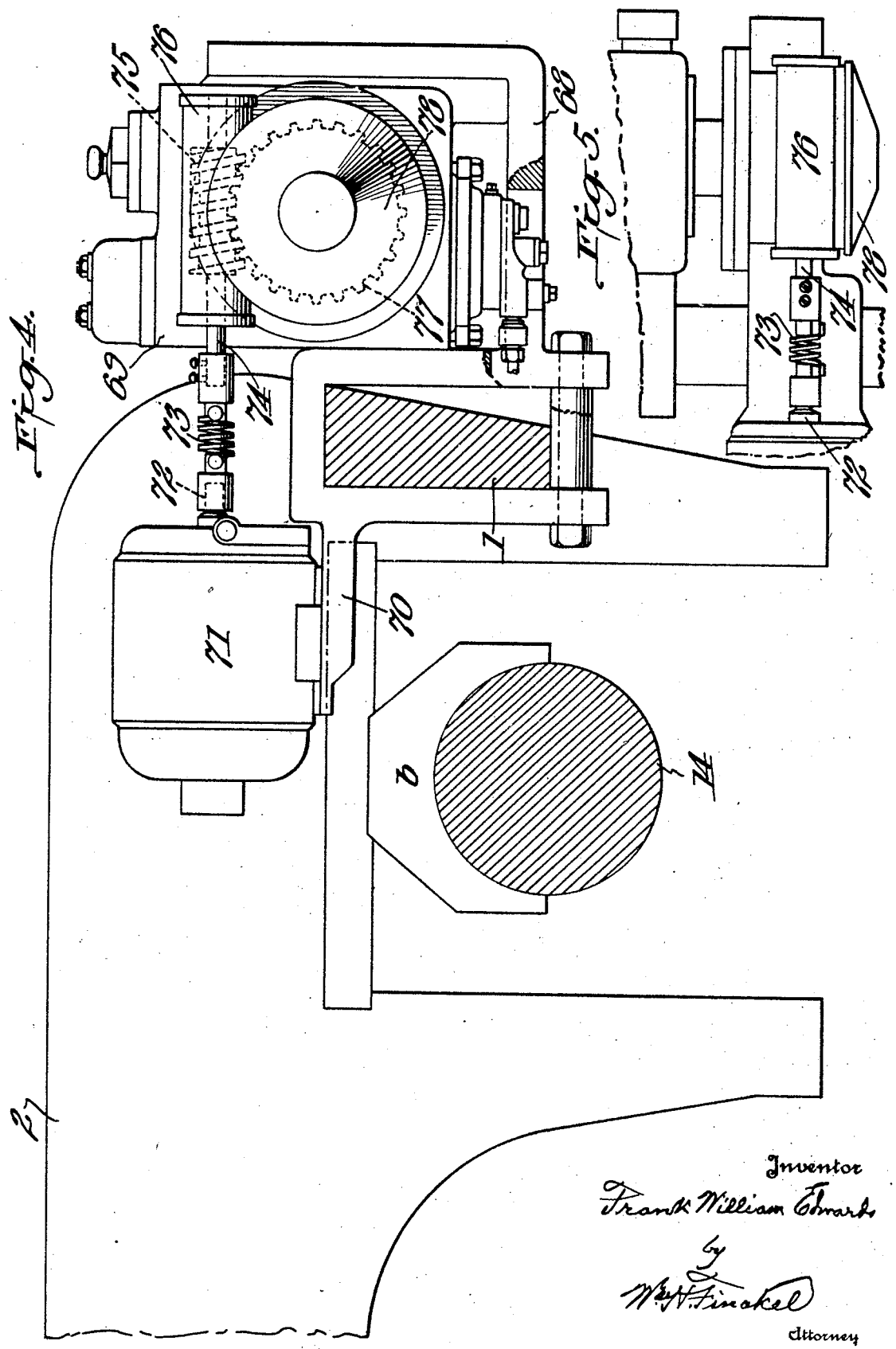

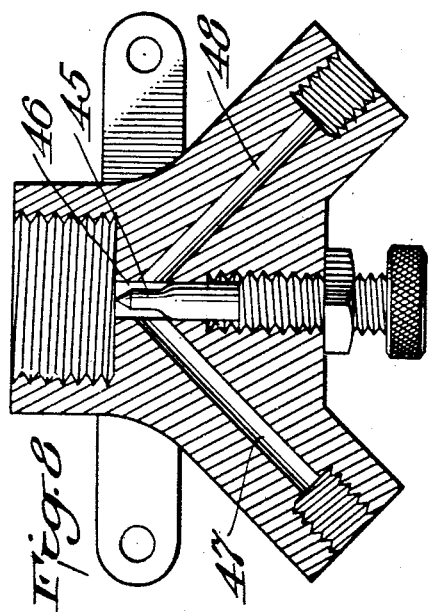
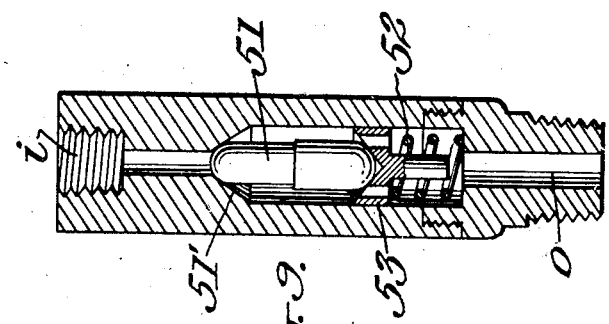
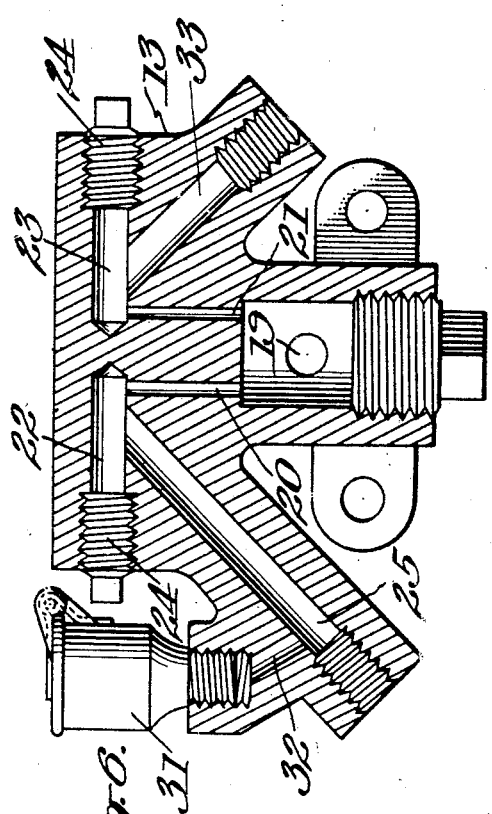
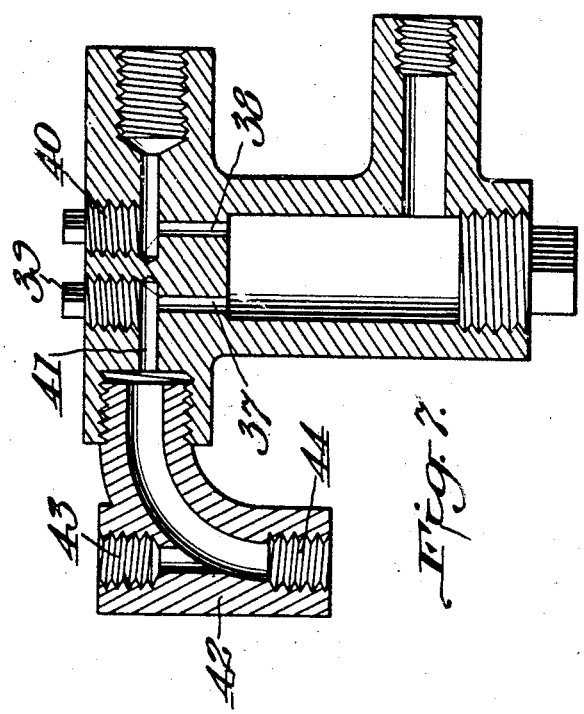

Patented Feb. 14, 1933

1,897,503

UNITED STATES PATENT OFFICE

FRANK WILLIAM EDWARDS, OF CHICAGO, ILLINOIS, ASSIGNOR TO THE OHIO INJECTOR COMPANY OF ILLINOIS, OF CHICAGO, ILLINOIS, A CORPORATION OF ILLINOIS

LUBRICATING APPARATUS

Application filed October 26, 1929. Serial No. 402,719.

In the lubrication of the moving parts of locomotive trucks, specifically the axles and wheel hubs, it has become the practice to feed lubricant to the axle bearing members and to devices known as hub liners, and the lubricant is applied directly, preferably in measured, predetermined quantities to these parts. In general where mechanical lubricators, that is to say, lubricators which have mechanically operated lubricant forcing or measuring means, are employed, it is customary to mount these lubricators upon some part of the locomotive frame, for example, the guide yoke for the valve motion, in such proximity to a moving part, say the valve motion, that movement may be derived from such moving part and transmitted to the mechanism of the lubricator by which its feeding or measuring function is performed.

Obviously, where the lubricator is so mounted, it is necessary to conduct the lubricant to the parts to be lubricated, the bearing brasses and hub liners mentioned, by means of suitable pipes or conduits leading from the several feeds of the lubricator to the brasses and hub liners. In such an installation where, necessarily, there is relative movement between the lubricator and the points of delivery (the brasses and hub liners) of the lubricant, the conduits or pipes mentioned must either be flexible themselves or must be provided with flexible connections.

Taking a locomotive front truck of the four wheel type as an example, an installation of the type mentioned in connection therewith would necessitate the extension of at least four pipes or conduits from the lubricator to the truck, with four flexible connections therefor, in order to supply an adequate quantity of lubricant to the eight points of delivery (four bearing brasses and four hub liners) on such a truck. There would also have to be eight other flexible connections between such conduits and the points of delivery to accommodate relative movement between the parts lubricated and the truck frame. Thus there would be at least twelve connections between relatively movable members, where failure of lubrication, due to leakage, breakage, stoppage and other faults occurring in the pipes or conduits might arise. Moreover, if removal or replacement of the truck should become necessary, there are four pipes to disconnect and reconnect.

The object of the present invention is to provide for the arrangement of the lubricator proper in such proximity to and intimate association with the points of delivery of the lubricant supplied by it that the disadvantages of installations of the kind hereinbefore described may be done away with.

To this end my invention contemplates the mounting of the lubricator and of a motor of appropriate type, such as an electric motor, directly upon the vehicle truck, preferably by means of a suitable bracket secured to the frame thereof, the lubricator and motor being arranged in such juxtaposition as to provide, in effect, a unitary structure or, at least, an individually driven lubricator, and to conduct the lubricant from the feeds of such lubricator by relatively rigid conduits or pipes directly to members by which it is directed to the points of delivery, the only flexible connections interposed in such conduits being those by which the feed of lubricant from said members to the points of delivery is accomplished.

Thus, where a four-wheel truck is provided with a lubricator arranged in accordance with my invention, as distinguished from the installation hereinbefore described where the lubricator is mounted upon the engine frame, at least four conduits and their necessary flexible connections are dispensed with and, instead of such conduits, the only connection between the relatively movable parts (locomotive frame and truck frame) will be some appropriate conductor, such as a two-wire electric cable, for supplying power to the motor by which the lubricator is operated, such conductor extending from the motor to an appropriate switch in the locomotive cab whereby the engineman may control the operation of the lubricator, all as I will proceed now to explain, and the novel features of which I will finally claim.

In the accompanying drawings illustrating the invention, in the several figures of which like parts are similarly designated, Figure 1 is an end elevation of a locomotive front truck having a lubricator applied thereto in accordance with my invention. Fig. 2 is a longitudinal partly mutilated section taken substantially in the plane of line 2—2 of Fig. 1, but upon a smaller scale. Fig. 3 is a fragmentary sectional elevation, upon a larger scale, showing one embodiment of a lubricator in combination with a motor and gearing for driving same. Fig. 4 is a sectional side elevation showing another modification of combined lubricator and driving motor. Fig. 5 is a fragmentary plan view of some of the parts shown in Fig. 4. Fig. 6 is a sectional elevation of a lubricant feed dividing member or manifold or "split". Figs. 7 and 8 are similar sectional elevations of modified forms of "splits". Fig. 9 is a sectional elevation of a terminal check valve such as may be employed at the delivery ends of lubricant feed conduits or pipes. Figs. 10, 11 and 12 are respectively a front elevation, a side elevation, and a rear elevation of a hub liner of well known type.

Referring particularly to Figs. 1, 2, 6 and 10 to 12, it will be seen that I mount upon one of the cross members or braces 1 of a truck frame 2 a bracket 3 suitably secured by bolts 4, and to this bracket I attach, in any suitable manner, as by means of a boss 5 with which the bolts 4 may cooperate, a lubricator 6 of the mechanical, force feed type, such as is disclosed in the copending applications of Frank William Edwards and Fordyce B. Farnsworth, for Lubricators, filed September 19, 1928, Serial No. 304,862, and filed August 15, 1930, Serial No. 475,528. Arranged in operative juxtaposition to, and preferably carried by the casing of such lubricator by means of suitable connected casing members, substantially as disclosed in the copending application of Frank William Edwards and Fordyce B. Farnsworth, for Mechanical lubricator with individual motor drive, filed October 30, 1929, Serial No. 403,537, is a motor 7, preferably an electric motor of suitable horse power and maximum rotative speed for this purpose, such motor being connected by gearing or otherwise with the mechanical force-feed mechanism of the lubricator.

In the installation shown (see particularly Fig. 1) the lubricator 6 has four feeds 8, 9, 10 and 11. The feed 8 is connected by means of a relatively rigid conduit 12 with a manifold or feed directing member or "split" 13 mounted over the axle 14 at one side of and on the truck frame. The feed 9 is connected by a relatively rigid pipe or conduit 15 with a similar "split" 13 arranged over the axle 14 at the opposite side of the truck. The feeds 10 and 11 are connected by means of relatively rigid pipes or conduits 16 and 17 with similar "splits" 13 arranged over the axle 18 at opposite sides of and upon the truck frame, one of these "splits" being shown in Fig. 2. Thus, when the lubricator is operated by means of the motor 7, lubricant will be forced from the various feeds 8, 9, 10 and 11 to the several "splits" 13 arranged as described and will be conducted thence as will be next described.

Referring to Fig. 6, wherein the preferred form of manifold or "split" is illustrated, such form being shown also in Figs. 1 and 2, it will be seen that the lubricant enters through an opening 19 into the body thereof from which it passes through bores 20 and 21 of predetermined appropriate size into chambers 22 and 23 respectively, provided with clean-out plugs 24. From the chamber 22 the lubricant flows by gravity through a bore 25 into a flexible conduit 26 (see Figs. 1 and 2) by which it is conducted through a nipple 27 and bore 28 into a pocket 29 in the bearing brass $b$ to which it is adapted to supply lubricant. From the pocket 29, the lubricant flows by gravity through grooves 30 formed in the bearing face of the brass into lubricating contact with the bearing portion of the axle. In the event, as sometimes happens, that additional lubricant needs to be supplied to the bearing brasses, I provide an oil cup 31, preferably of the spring cap type, into which the engine man may introduce oil, as by means of an oil can, the oil flowing from such cup through a passage 32 into the bore 25 and thence through the flexible conduit 26 into the pocket 29 from which it is distributed over the bearing face of the brass.

From the chamber 23 the lubricant feeds by gravity into a bore 33 to which is connected a flexible conduit 34 (Figs. 1 and 2) which in turn is connected with a hub liner $l$ provided with a lubricant receiving passage 35 which opens into a groove 36 formed in the face of the liner which lies adjacent to the face of the hub of the wheel. Thus lubricant flowing from the chamber 23 through bore 33 and flexible conduit 34 is applied by means of the groove 36 to the inner face of the wheel hub.

Inasmuch as all of the "splits" of the type shown in Fig. 6 and their connections with the various brasses and hub liners are the same, this description will suffice for all, and all will be found to bear the same reference characters.

As will be seen, particularly by reference to Figs. 2 and 10, wherein the left hand side of the figure may be taken as the front end of the truck, the passage 35 communicates with the groove 36 at a point to the rear of the vertical center line of the axle. Thus the rear portion $a$ of the groove is in more direct communication with the source of lubricant supply than is the forward portion $a'$ thereof. This arrangement is made for the purpose of applying the lubricant first, or in greater quantity, to the rising side of the hub during rotation thereof, which results in an even distribution of the lubricant over the face of the hub. Were the lubricant otherwise applied, centrifugal action caused by the rotation of the wheel hub would have a tendency to throw the lubricant off of the hub before it had had an opportunity to perform its lubricating function.

It will thus be seen that in an installation such as that shown in the drawings, where it is desired to lubricate the brasses and hub liners of a four-wheel truck, a lubricator having four feeds may be used, and the lubricant from each feed divided by the "split" 13 connected with the conduit leading from such feed into two streams, one of which streams is conducted to the adjacent axle brass and the other to the adjacent hub liner, thereby making possible the delivery of lubricant in desired adequate quantities at eight points of delivery from four main feeds.

The "split" or manifold shown in Fig. 7 has the same characteristics as that shown in Fig. 6, in so far as the control of the feed of lubricant therethrough is concerned. However, the bores 37 and 38 thereof corresponding respectively to the bores 20 and 21 of the "split" of Fig. 6 are so arranged that they may have alined with them plugs 39 and 40 which may be removed for cleaning purposes. Moreover, instead of providing the chamber 41, which corresponds to the chamber 22 of the "split" of Fig. 6, with an integrally formed member providing a passage for conducting the lubricant to the axle brass and with an integrally formed boss for the reception of an oil cup, I arrange in communication with this chamber 41 a screw-threaded elbow 42 having a threaded socket 43 to receive an oil cup, this elbow also being provided with a connection 44 for the conduit leading to the axle brass. Obviously, this elbow may be removed from the "split", if desired, where introduction of additional oil is not required, and the lubricant conducted directly from the chamber 41 to the axle brass.

In the form of "split" illustrated in Fig. 8, instead of providing bores similar to the bores 20 and 21 of Fig. 6 and 37 and 38 of Fig. 7, of predetermined diameter for the control of the feed of lubricant, I provide a needle valve 45 which may be adjusted relatively to the lubricant inlet 46 to control the rate of flow of lubricant into the passages 47 and 48 leading to the points of delivery.

In installations where lubricant is conducted under pressure directly from the lubricator to the point of delivery, without the interposition of a "split" or manifold, it is essential that a check valve be used at the delivery end of each of the conduits thus conducting the lubricant. Such a check valve is illustrated in Fig. 9. This check valve embodies the operative principle disclosed in my copending application for patent for Terminal valves for force feed lubricators, filed July 8, 1927, Serial No. 204,213. In such check valve there is interposed between the inlet $i$ and the outlet $o$, a capsule-shaped valve 51 normally retained in closed or seated position upon a seat 51' by means of a spring 52 acting against an apertured follower 53. When lubricant under pressure sufficient to counteract the force of spring 52 enters the inlet $i$, the valve 51 will be forced downward compressing the spring 52, and the lubricant will pass around the valve 51 and through the apertures in the follower 53 and flow thence through the outlet $o$. When pressure is relieved at the inlet $i$, the valve 51 will again seat under the influence of the spring 52 and, due to its form and arrangement, will always engage its seat 51' in a fluid tight manner, even though it may be out of axial alignment therewith.

Although the preferred embodiment of the combination of lubricator and individual driving motor therefor is illustrated in Figs. 1 and 2, as specifically disclosed in the copending application of Frank William Edwards and Fordyce B. Farnsworth, for Mechanical lubricator with individual motor drive hereinbefore referred to, I have shown in Figs. 3, 4 and 5 other arrangements whereby the combination of the motor with the lubricator may be effected. Moreover, in Fig. 3 I have shown in fragmentary sectional elevation one unit of the lubricant forcing or measuring mechanism of the lubricator and its connected feed.

In Fig. 3 a bracket 54 adapted to replace the bracket 3 of Figs. 1 and 2 is provided, this bracket being arranged to have the lubricator bolted to it as shown at 55, and having an extension 56 upon which is mounted the motor 57 with its shaft 58 arranged at right angles to the cam shaft 59 of the feed mechanism of the lubricator. This motor shaft 58 extends into the casing 60 of the lubricator and is provided with suitable bearings 61 and 62 therein and carries a worm 63 which meshes with a worm wheel 64 keyed or otherwise fixed upon the cam shaft 59. The ratio between the worm 63 and worm wheel 64 is such that the speed of rotation of the motor shaft 58 will be so reduced as transmitted to the cam shaft 59 that said cam shaft will, through its cams 65, impart forcing action to the push rods 66 and pistons or plungers 67 of the oil forcing or measuring mechanism at such desired predetermined intervals as to provide the necessary, predetermined, adequate feed of lubricant from the lubricator.

In Figs. 4 and 5, wherein another embodiment is shown, a bracket 68 is used, this bracket being mounted in a manner similar to the bracket 3 of Figs. 1 and 2 and carrying the lubricator 69, but provided with an extension 70 to which is attached a motor 71 having its shaft 72 connected by a suitable flexible universal coupling, including a helical spring 73. with the shaft 74 of a worm 75 mounted in a casing 76 preferably separate from but attached to the casing of the lubricator 69. This worm 75 meshes with a worm wheel 77 housed in an extension 78 of the casing 76. The worm wheel 77 is connected by means of a suitable shaft and couplings (not shown) with the cam shaft of the lubricator.

By the various embodiments of apparatus hereinbefore described, it will be seen that I provide an organization of such a nature that the axles and wheel hubs of a vehicle truck, preferably a locomotive front truck, may be supplied with adequate quantities of lubricant from a lubricator carried by the frame of the truck and having associated with it, substantially as a unitary member, a motor for imparting to the feeding or forcing mechanism of the lubricator the necessary operation to cause it to perform its functions. By this arrangement, as hereinbefore indicated, I not only do away with a plurality of connections heretofore used for conducting lubricant from a lubricator mounted on the locomotive frame to points of delivery on the truck, but I associate the lubricator in such close proximity to the points of delivery as to make less likely failure of lubricant feed than has heretofore been possible.

By eliminating the multiplicity of connections mentioned, repairs and replacements both in the lubricating assembly and in the truck itself are simplified. The truck may be detached from the locomotive, so far as the lubricating assembly is concerned, by simply disconnecting the cable which supplies electric current to the motor, as distinguished from disconnecting the several lubricant conduits heretofore employed; and once the truck is removed from the locomotive inspectors and repair of the various parts can be much more easily made.

Although I have hereinbefore particularly referred to an electric motor as the means for furnishing driving power for the lubricator, it is to be understood that other motors, for example air or steam motors of turbine or other appropriate type, may be used. Where such other motors are used, a single pipe extending from the locomotive to the motor for connecting the motor with a source of motive fluid will be the only connection between the lubricator unit and the locomotive, as the electric cable is the only connection of this nature where an electric motor is used.

Various changes, substitutions and modifications other than and in addition to those specifically mentioned, are considered to be within the spirit of the invention and the scope of the following claims.

What I claim is:—

1. The combination with a truck having wheels and an axle, bearings for said axle provided with lubricant passages whereby lubricant may be supplied to said axle, and means arranged adjacent to the hubs of said wheels whereby lubricant may be supplied to said hubs, of a self-contained lubricator supported directly upon said truck and provided with a plurality of feeds and mechanically operated means for supplying lubricant to such feeds, a motor arranged in juxtaposition to said lubricator to form an individual drive therefor and connected with said mechanically operated means to operate the same, conduits including manifolds whereby the lubricant from each feed is divided, and flexible conduits affording communication between said manifolds and said bearings and hub lubricating means, so that lubricant may be fed from the lubricator directly to the axle and wheels of the truck upon which the lubricator is mounted.

2. The combination with a truck having wheels and axles, bearing brasses for said axles provided with lubricant passages whereby lubricant may be supplied to said axles, and hub liners arranged adjacent to the hubs of said wheels whereby lubricant may be supplied to said hubs, of a self-contained lubricator supported directly upon said truck and provided with a plurality of feeds of less number than the combined number of said brasses and hub liners and with mechanically operated means for supplying lubricant to said feeds, a motor arranged in juxtaposition to said lubricator to form an individual drive therefor and connected with said mechanically operated means to operate the same, a conduit extending from each of said feeds into proximity to each of said wheels, a manifold communicating with each of said conduits and arranged to divide the lubricant fed to it into two streams, conduits connecting each of said manifolds with its adjacent bearing brass, and conduits connecting each of said manifolds with its adjacent hub liner, whereby each of said feeds may supply lubricant to an axle brass and a hub liner.

3. The combination with a truck having wheels and axles, bearing brasses for said axles provided with lubricant passages whereby lubricant may be supplied to said axles, and hub liners arranged adjacent to the hubs of said wheels whereby lubricant may be supplied to said hubs, of a self-contained lubricator supported directly upon said truck and provided with a plurality of feeds of less number than the combined number of said brasses and hub liners and with mechanically operated means for supplying lubricant to such feeds, a motor arranged in juxtaposition to said lubricator to form an individual drive therefor and connected with said mechanically operated means to operate the same, a relatively rigid conduit extending from each of said feeds into proximity to each of said wheels, a manifold communicating with each of said conduits and arranged to divide the lubricant fed to it into two streams, relatively flexible conduits connecting each of said manifolds with its adjacent bearing brass, and relatively flexible conduits connecting each of said manifolds with its adjacent hub liner, whereby each of said feeds may supply lubricant to an axle brass and a hub liner.

4. The combination with a truck having a frame and wheels and axles, bearing brasses for said axles, and hub liners for said wheels, said brasses and hub liners provided with lubricant distributing passages, of a bracket detachably mounted upon said frame, a self-contained lubricator mounted on said bracket and carried directly by said frame, said lubricator provided with a plurality of lubricant feeds and mechanically operated means for supplying lubricant to such feeds, a motor arranged in juxtaposition to said lubricator to form an individual drive therefor and having an operative connection with said mechanically operated means to operate the same, and conduits affording communication between said lubricant feeds and said brasses and hub liners, whereby lubricant may be fed from the lubricator directly thereto.

5. The combination of a wheeled framework, a power-actuated lubricator mounted directly upon said framework, the wheels having bearing and liner parts, multi-bored manifolds fixedly supported upon said framework and rigidly piped to the lubricator and having flexible connections with said bearing and liner parts.

6. The combination of a wheeled truck frame, a force-feed lubricator rigidly mounted upon said frame, bearing parts for the wheels, multi-discharge manifolds mounted upon fixed parts of the frame in proximity to said bearing parts, pipes connecting the lubricator and said manifolds, and flexible conduits leading from said manifolds to the parts to be lubricated.

7. The combination with a truck having wheels and an axle, and bearings for said axle provided with lubricant passages whereby the lubricant may be supplied to the axle, of a self-contained lubricator supported directly upon said truck and provided with a plurality of feeds and mechanically operated means for supplying lubricant to such feeds, a motor arranged in juxtaposition to said lubricator to form an individual drive therefor and connected with said mechanically operated means to operate the same, conduits including manifolds whereby the lubricant from each feed is divided, and flexible conduits affording communication between said manifolds and said bearings, so that lubricant may be fed from the lubricator directly to the axle of the truck upon which the lubricator is mounted.

In testimony whereof I have hereunto set my hand this 24th day of October, A. D. 1929.

FRANK WILLIAM EDWARDS.